United States Patent
Park et al.

(10) Patent No.: US 7,480,336 B2
(45) Date of Patent: Jan. 20, 2009

(54) MULTI-CARRIER TRANSMISSION SYSTEMS AND METHODS USING SUBCARRIER RELOCATION AND GUARD INTERVAL INSERTION

(75) Inventors: Jun-Hyun Park, Seoul (KR); Dong-Kyu Kim, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 749 days.

(21) Appl. No.: 10/703,646

(22) Filed: Nov. 7, 2003

(65) Prior Publication Data

US 2004/0120413 A1 Jun. 24, 2004

(30) Foreign Application Priority Data

Nov. 7, 2002 (KR) .................. 10-2002-0068872

(51) Int. Cl.
*H04L 27/28* (2006.01)
*H04K 1/10* (2006.01)

(52) U.S. Cl. ....................... 375/260; 375/295

(58) Field of Classification Search ............. 375/260, 375/295

See application file for complete search history.

(56) References Cited

U.S. PATENT DOCUMENTS

| 5,537,441 | A | * | 7/1996 | Bremer et al. | ........... 375/261 |
|---|---|---|---|---|---|
| 6,657,950 | B1 | * | 12/2003 | Jones, IV et al. | ........... 370/208 |
| 6,687,307 | B1 | * | 2/2004 | Anikhindi et al. | ........... 375/260 |
| 6,873,650 | B1 | * | 3/2005 | Banerjea et al. | ........... 375/219 |
| 7,072,411 | B1 | * | 7/2006 | Dollard | ........... 375/260 |
| 7,110,387 | B1 |   | 9/2006 | Kim et al. |  |
| 7,158,475 | B1 |   | 1/2007 | Ikeda et al. |  |
| 2002/0122382 | A1 | * | 9/2002 | Ma et al. | ........... 370/208 |
| 2004/0240535 | A1 | * | 12/2004 | Verma et al. | ........... 375/222 |

FOREIGN PATENT DOCUMENTS

| CN | 1322416 A | 11/2001 |
|---|---|---|
| CN | 1347602 A | 5/2002 |
| WO | WO02058294 A1 | 7/2002 |

* cited by examiner

*Primary Examiner*—Chieh M. Fan
*Assistant Examiner*—Freshteh N Aghdam
(74) *Attorney, Agent, or Firm*—Myers Bigel Sibley & Sajovec, PA

(57) ABSTRACT

There is provided a multi-carrier transmission system which includes: an encoder for converting a data sequence into encoded symbols corresponding to respective sub-carriers; a first shifter for rearranging the encoded symbols to define a guard interval length; an inverse fast Fourier transform (IFFT) unit for inverse fast Fourier transforming the rearranged encoded symbols; a second shifter for processing the transformed symbols to effect a frequency shift to compensate for a frequency shift effected by the IFFT unit; and a guard interval inserter for interleaving symbol replicas with the processed symbols according to the guard interval length. The data transmission system of the present invention performs sub-carrier relocation function and guard interval insertion function using relatively simple elements in order to reduce the data processing time. As a result, the transmission efficiency of the entire communication system is enhanced.

20 Claims, 20 Drawing Sheets

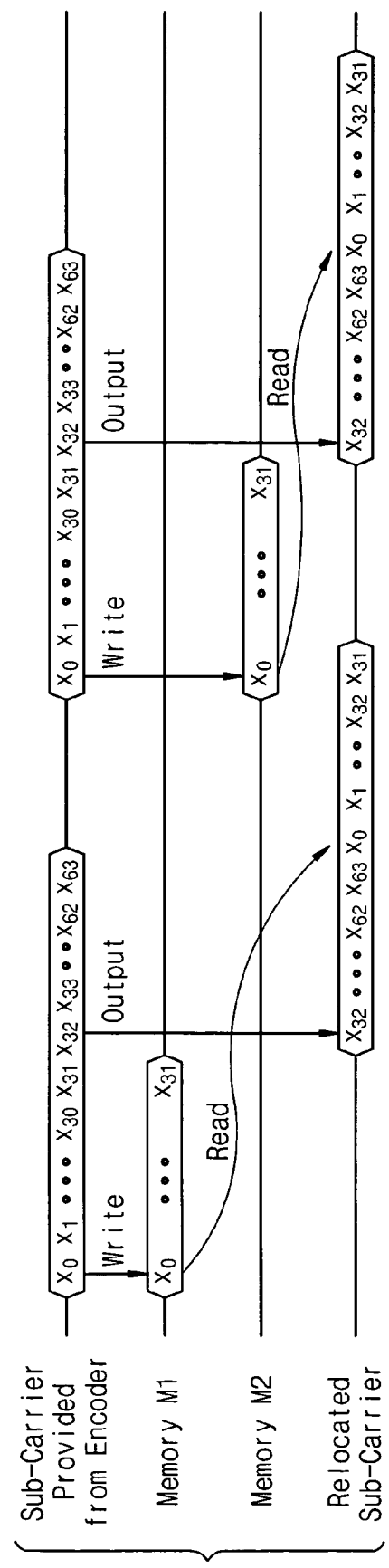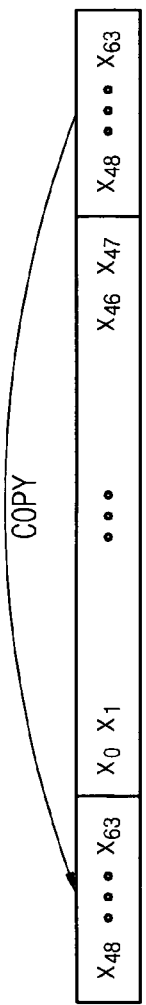
Fig. 5
(RELATED ART)
Fig. 6
(RELATED ART)

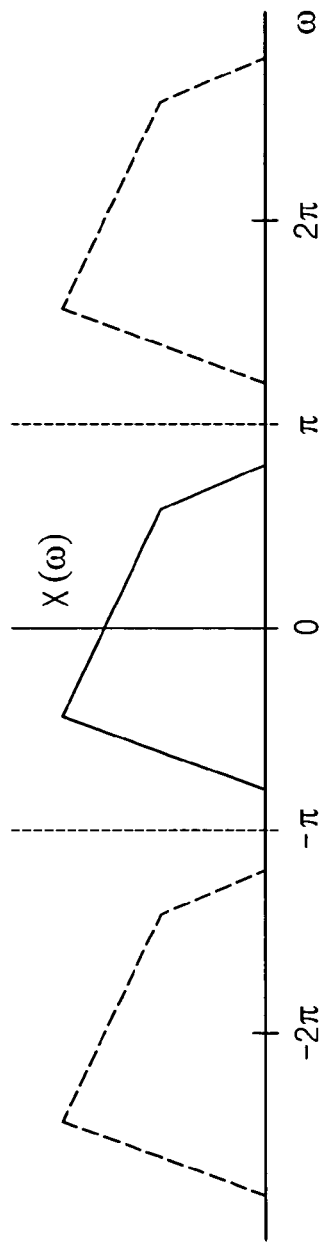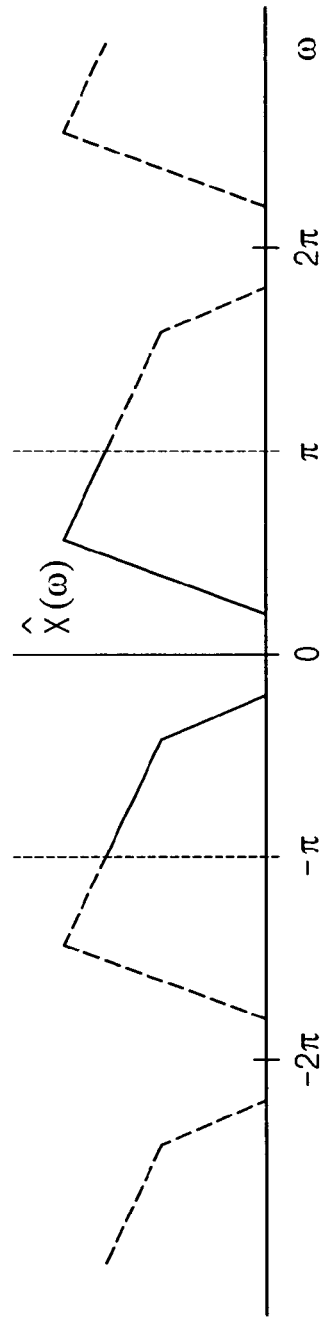

MULTI-CARRIER TRANSMISSION SYSTEMS AND METHODS USING SUBCARRIER RELOCATION AND GUARD INTERVAL INSERTION

RELATED APPLICATION

This application claims priority from Korean Patent Application No. 2002-68872 filed on Nov. 7, 2002 in the Korean Intellectual Property Office, the disclosure of which is incorporated herein in its entirety by reference.

FIELD OF THE INVENTION

The present invention relates to a multi-carrier transmission system, and more particularly, to multi-carrier transmission systems and methods using orthogonal frequency division multiplexing (OFDM).

BACKGROUND OF INVENTION

Generally, OFDM is a multi-carrier modulation that includes converting data to be transmitted into complex symbols using M-array quadrature amplitude modulation (M-QAM), converting the complex symbol sequence into a plurality of parallel complex symbols through series-to-parallel conversion, rectangular pulseshaping the plurality of parallel complex symbols, and modulating the rectangular pulseshaped symbols with a plurality of sub-carriers. In OFDM, the frequency interval between the sub-carriers typically is set so that the sub-carrier modulated parallel rectangular pulseshaped signals are orthogonal to each other.

When a M-QAM modulated signal is transmitted through a wireless fading channel without using OFDM and the channel delay spread caused by multi-path delay is greater than the symbol period of the modulated signal, inter-symbol interference (ISI) can be caused, and it may be difficult to restore a signal correctly at a receiver. Accordingly, an equalizer can be employed to compensate random delay spread. However, the configuration of the equalizer may be very complex, and the transmission performance may degenerate greatly due to input noise at the receiver.

In contrast, because OFDM permits the symbol period of each parallel square wave signal to be much longer than the channel delay spread, ISI can be reduced. In addition, because the guard interval can be set to a longer length than the delay spread in OFDM, the ISI can be substantially removed and the sub-carriers can be maintained orthogonal to each other, thus reducing interference between channels. Accordingly, as OFDM can be effective in data transmission through a wireless fading channel, it is now employed as the standard transmission method for European TERRESTRIAL digital television and audio broadcast system. In addition, OFDM is frequently used in a data transmission system using wire channels, such as a digital subscriber loop system or a power line communication system, to reduce transmission performance degeneration due to multi-path reflection.

FIG. 1 illustrates a transmitting part of a data transmission system using OFDM. Referring to FIG. 1, the transmitting part 10 of the data transmission system using OFDM includes an encoder 11, a sub-carrier relocating unit 12, an inverse fast Fourier transform (IFFT) unit 13, a guard interval inserter 14, a low pass filter 15 and a digital-to-analog converter 16. The encoder 11 encodes data to be transmitted into encoded symbols corresponding to sub-carriers in the form of M-QAM, phase shift keying (PSK) and differential PSK (DPSK). The encoder 11 may use many methods to perform channel encoding, including convolution encoding, block encoding, turbo encoding, and the like. The sub-carrier relocating unit 12 relocates symbols corresponding to respective sub-carrier channels provided from the encoder 11 to make it suitable for the IFFT unit 13 (for purposes of the present description, symbols corresponding to respective sub-carrier channels may be referred to as "sub-carriers"). The IFFT unit 13 transforms the symbols in a frequency domain based on the sampling theorem. The guard interval inserter 14 inserts a guard interval in each frame output from the IFFT unit 13 to remove ISI. The low pass filter 15 removes a noise component included in the signal output from the guard interval inserter 14. The digital-to-analog converter 16 converts a digital signal output from the low pass filter 15 into an analog signal. The analog signal converted by the digital-to-analog converter 16 is transmitted through a wire or wireless channel.

FIG. 2 illustrates a receiving part of a data transmission system using ODFM. The receiving part 20 can include an analog-to-digital converter 21, a low pass filter 22, a guard interval remover 23, a fast Fourier transform (FFT) unit 24, a sub-carrier relocating unit 25, and a decoder 26. The analog-to-digital converter 21 converts an analog signal received through the wire or wireless channel into a digital signal. The guard interval remover 23 removes the guard interval from the signal provided through a low pass filter 22. The FFT unit 24 transforms the signals output from the guard interval remover 23 in a time domain. The sub-carrier relocating unit 25 relocates the linear arrangement of sub-carriers in the frequency domain output from the FFT unit 24 to make it suitable for the decoder 26. The decoder 26 includes a deinterleaver and a Viterbi decoder.

As shown in FIGS. 1 and 2, the components included in the transmitting part 10 and the receiving part 20 operate complementary to each other. Therefore, the following description will be made with respect to the transmitting part 10, while the description of the receiving part 20 will be omitted.

The configuration and the operation of the sub-carrier relocating unit 12 will be described in reference to FIG. 3. Referring to FIG. 3, the sub-carrier relocating unit 12 relocates the linear arrangement of the sub-carriers provided by the encoder 11 and supplies the relocated sub-carriers to the IFFT unit 13.

In this specification, it is assumed that the dimensions of the IFFT unit 13 and the FFT unit 24 are both X64. However, the sizes of the IFFT unit 13 and the FFT unit 24 may vary, and the components of each change depending upon their respective sizes. In addition, the data transmission system described follows the 802.11a Wireless LAN standard. In the following description, the contents disclosed in IEEE 802.11a Wireless LAN standard will be referred to and recited.

The encoder 111 outputs the sub-carriers x0-x31, corresponding to angular frequencies 0 to $\pi$, and the sub-carriers x32-x63, corresponding to angular frequencies $\pi$ to $2\pi$, sequentially. As is known by those skilled in the art, IFFT 13 should receive the sub-carriers x32-x63, corresponding to angular frequencies $\pi$ to $2\pi$ (that is, angular frequencies $-\pi$ to 0), and the sub-carriers x0-x31, corresponding to angular frequencies 0 to $\pi$, in order. The sub-carrier relocating unit 12 relocates the linear arrangement of the sub-carriers x0-x63 output from the encoder 11 into a new linear arrangement (x32-x63, x0-x31) as described above.

The internal circuit configuration of the sub-carrier relocating unit 12 is illustrated in FIG. 4, and the timing diagram illustrating operation of the sub-carrier relocating unit 12 is shown in FIG. 5. Referring to FIG. 4, the sub-carrier relocating unit 12 includes a controller C1, memories M1 and M2 and a multiplexer U1. The sub-carriers x0-x31, corresponding to angular frequencies 0 to π, and the sub-carriers x32-x63, corresponding to angular frequencies π to 2π (that is, angular frequencies −π to 0), are sequentially provided from an encoder 11 to the sub-carrier relocating unit 12. The controller C1 controls the sub-carriers x0-x31 to be stored in the memory M1 when they are provided from the encoder 11. Subsequently, the controller C1 controls the sub-carriers x32-x63 to be output through the multiplexer U1 when they are provided from the encoder 11. When all the sub-carriers x32-x63 are output, the controller C1 controls the sub-carriers x0-x31 stored in the memory M1 to be read out and output through the multiplexer U1.

If the sub-carriers x0-x31 that belong to the next frame are provided from the encoder 11 while the sub-carriers x0-x31 are being output though the multiplexer U1, the controller C1 controls the sub-carriers x0-x31 to be stored in the memory M2. Subsequently, the controller C1 controls the sub-carriers x32-x63 to be output through the multiplexer U1 when the sub-carriers x32-x63 are provided from the encoder 11. When all the sub-carriers x32-x63 are output, the controller C1 controls the sub-carrier x0-x31 stored in the memory M2 to be read out and output through the multiplexer U1. The sub-carrier relocating unit 12 relocates the linear arrangement of the sub-carriers provided from the encoder 11 to make it suitable for the IFFT unit 13 and outputs the relocated linear arrangement of the sub-carriers as described above.

However, as described above, the conventional sub-carrier relocating unit 12 may require two memories M1 and M2. When the number of the sub-carriers of one frame is N and one sub-carrier is output from the sub-carrier relocating unit 12 at every clock cycle, a delay of N/2 can occur due to the sub-carrier relocating unit 12.

FIG. 6 illustrates operation of a guard interval inserter 14 shown in FIG. 1. Referring to FIG. 6, the guard interval inserter 14 copies the last 16 sub-carriers x48-x63 to the front of the frame and configures a new frame including 80 sub-carriers x48-x63, x0-x63.

FIG. 7 is a block diagram illustrating an internal circuit configuration of a guard interval inserter 14. FIG. 8 is a timing chart illustrating operation of the guard interval inserter 14. Referring to FIG. 7, the guard interval inserter 14 includes a controller C2, memories M3 and M4, and a multiplexer U2. The controller C2 controls the 64 sub-carriers x0-x63 to be stored in the memory device M3. If the index of the sub-carriers output from IFFT unit 13 is 48 or higher, the controller C2 controls the sub-carriers output from IFFT unit 13 to be stored in the memory M3, and, in addition, output to the low pass filter 15. When all the sub-carriers x48-x63 output from the IFFT unit 13 are output through the multiplexer U2, the controller C2 controls the sub-carriers x0-x63 stored in the memory M3 to be read out and output through the multiplexer U2. Therefore, the guard interval inserter 14 outputs sub-carriers x48, x49, . . . , x63, x0, x1, . . . , x63 as the newly configured frame.

If the sub-carriers x0-x63 that belong to the next frame are input from the IFFT unit 13 while the sub-carriers x0-x63 stored in the memory M3 are being output through the multiplexer U2, the controller C2 stores the input sub-carriers x0-x63 in the memory M4. After all the sub-carriers x0-x63 stored in the memory M3 are read out and output through the multiplexer U2, the controller C2 controls the sub-carriers x48-x63 of the next frame input from IFFT unit 13 to be output through the multiplexer U2. If the sub-carrier x63 is output through the multiplexer U2, the controller C2 controls the sub-carriers x0-x63 stored in the memory M4. The controller C2 controls the sub-carriers x48-x63 of the next frame to be output through the multiplexer U2 after all the sub-carriers x0-x63 stored in the memory M3 are read out and output through the multiplexer U2. When the sub-carrier x63 is output through the multiplexer U2, the controller C2 controls the sub-carriers x0-x63 stored in the memory M4 read out and output through the multiplexer U2.

As described above, the conventional guard interval inserter 14 can reduce ISI by inserting a guard interval into the front of one frame using two memories M3 and M4. However, assuming that the number of sub-carriers in one frame and the number of the sub-carriers belonging to a guard interval are N and G, respectively, and one sub-carrier is output from the sub-carrier relocating unit 12 every clock cycle, the conventional guard interval inserter 14 may introduce a delay of N−G clock cycles. The sum of the delay of the sub-carrier relocating unit 12 described above and the delay due to the guard interval inserter 14 may be N/2+(N−G). Therefore, the total delay of the transmitting part 10 and the receiving part 20 may be N/2+(N−G)+N/2=2N−G. Such a delay can deteriorate the transmission efficiency of the entire communication system.

SUMMARY OF THE INVENTION

Accordingly, the present invention is directed to a multi-carrier transmission system that substantially obviates one or more problems due to limitations and disadvantages of the related art.

Certain embodiments of the present invention are directed toward multi-carrier transmission systems. The multi-carrier transmission system may include (a) an encoder that converts a data sequence of length N into encoded symbols corresponding to respective sub-carriers; (b) a first (or time) shifter that rearranges the encoded symbols to define a guard interval length, G; (c) an inverse fast Fourier transform (IFFT) unit that inverse fast Fourier transforms the rearranged symbols; (d) a second (or frequency) shifter that processes the transformed symbols to effect a frequency shift to compensate for the frequency shift effected by the IFFT unit; and (e) a guard interval inserter that interleaves symbol replicas with the processed symbols according to the guard interval length.

In certain embodiments, the first (or time) shifter includes (a) phase shifters that shift the angular frequency of the encoded symbols; (b) a counter that increases a count value in response to a clock signal; and (c) a multiplexer that outputs the encoded symbols and the phase-shifted symbols in response to the count value.

In particular embodiments, the phase shifters included in the first (or time) shifter multiply the encoded symbols by a multiplier according to the equation $$x(n-i) \leftrightarrow X(k)e^{\frac{-j2\pi ki}{N}},$$

wherein i is the length of the guard interval in terms of N. For example, in some embodiments where the guard interval length G is N/4, the first (or time) shifter includes three phase shifters. The first phase shifter shifts the angular frequency of certain encoded symbols by −90°; the second by −180°, and the third by 90° according to the above stated equation. In still further embodiments where the guard interval length G is N/2, the first (or time) shifter includes only one phase shifter that shifts the angular frequency of certain encoded symbols by 180° according to the above stated equation.

In further embodiments of the present invention, the second (or frequency) shifter includes (a) a multiplier that multiples the transformed symbols according to the equation $$x(n)e^{\frac{-j2\pi mn}{N}} \leftrightarrow X(k-m),$$

wherein m=N/2; (b) a counter that increases a count value in response to a clock signal; and (c) a multiplexer that outputs the transformed symbols and the multiplied symbols in response to the count value.

In still further embodiments, the guard interval inserter includes (a) a controller that determines whether the symbols output from the second (or frequency) shifter correspond to the guard interval; (b) a shift register that stores symbols determined by the controller to correspond to the guard interval; and (c) a multiplexer that outputs the symbols output from the second (or frequency) shifter and the symbols stored in the shift register.

Other embodiments of the present invention are directed toward methods of transmitting a multi-carrier signal. The methods may include (a) converting a data sequence of length N into encoded symbols corresponding to respective sub-carriers; (b) rearranging the encoded symbols to define a guard interval length G; (c) inverse fast Fourier transforming the rearranged encoded symbols; (d) processing the transformed symbols to effect a frequency shift that compensates for a frequency shift effected by the inverse fast Fourier transformation; and (e) interleaving symbol replicas with the processed symbols according to the guard interval length.

In certain embodiments, rearranging the encoded symbols to define a guard interval length G includes (a) receiving encoded symbols; (b) determining the index associated with each of the received symbols; and (c) shifting the angular frequency of some of the received symbols based on the index associated with each symbol.

In further embodiments, rearranging the encoded symbols to define a guard interval length G includes shifting the encoded symbols in order to position the last G symbols, corresponding to the guard interval, in the front of the data sequence.

In still further embodiments of the present invention, processing the transformed symbols to effect a frequency shift includes (a) receiving the transformed symbols; (b) determining the index associated with each of the received symbols; and (c) multiplying certain of the received symbols by −1 according to the equation $$x(n)e^{\frac{-j2\pi mn}{N}} \leftrightarrow X(k-m),$$

wherein k is the index of the symbol and m is N/2.

In certain embodiments, interleaving symbol replicas with the processed symbols according to the guard interval length includes (a) receiving the processed symbols; (b) determining whether each of the processed symbols corresponds to the guard interval; (c) storing the guard interval symbols in a shift register; (d) outputting the processed symbols; and (e) outputting the guard interval symbols stored in the shift register at the rear of the output processed symbols.

Other embodiments of the present invention are directed to multi-carrier receiving systems and methods of receiving a multi-carrier signal. The multi-carrier receiving systems may include (a) a guard interval remover that removes a guard interval included in a received signal; (b) a shifter that processes the remaining symbols to effect a frequency shift; (c) a fast Fourier transform (FFT) unit that fast Fourier transforms the processed symbols; and (d) a decoder that demodulates the transformed symbols and performs a channel decoding of the demodulated symbols.

Receiving a multi-carrier signal according to certain embodiments of the present invention may include (a) removing a guard interval included in a received signal; (b) processing the remaining symbols to effect a frequency shift; (c) fast Fourier transforming the processed symbols; (d) demodulating the transformed symbols; and (e) performing a channel decoding of the demodulated symbols.

BRIEF DESCRIPTION OF THE DRAWINGS

The accompanying drawings, which are included to provide a further understanding of the invention and are incorporated in, and constitute a part of, this application, illustrate embodiments of the invention and, together with the description, serve to explain the principles of the invention. In the drawings:

FIG. 5 is a timing diagram illustrating operation of the sub-carrier relocating unit;

FIG. 6 illustrates schematically the operation of a guard interval inserter shown in FIG. 1;

FIGS. 13A and 13B are frequency spectra of signals to be input to an IFFT unit;

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 9:
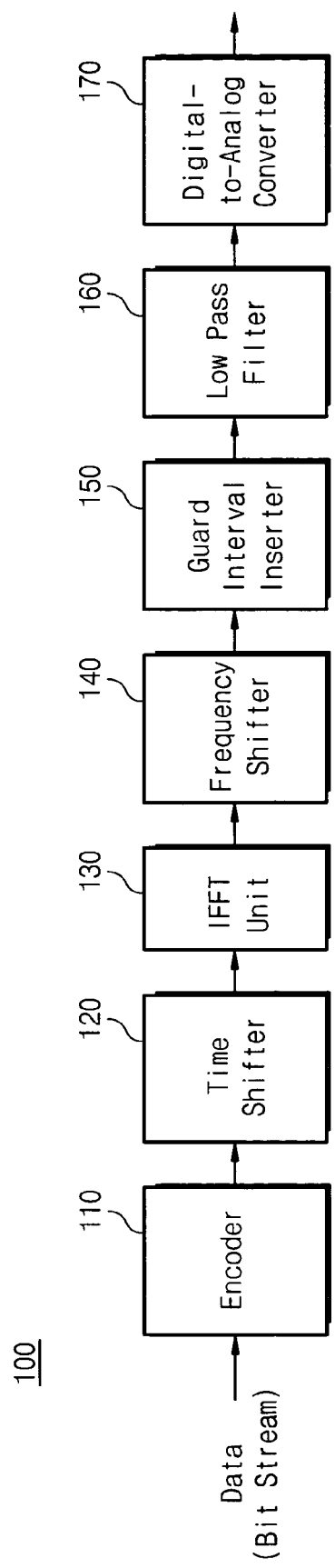
FIG. 9 is a block diagram of the transmitting part of a data transmission system using OFDM according to embodiments of the present invention.
Figure 10:
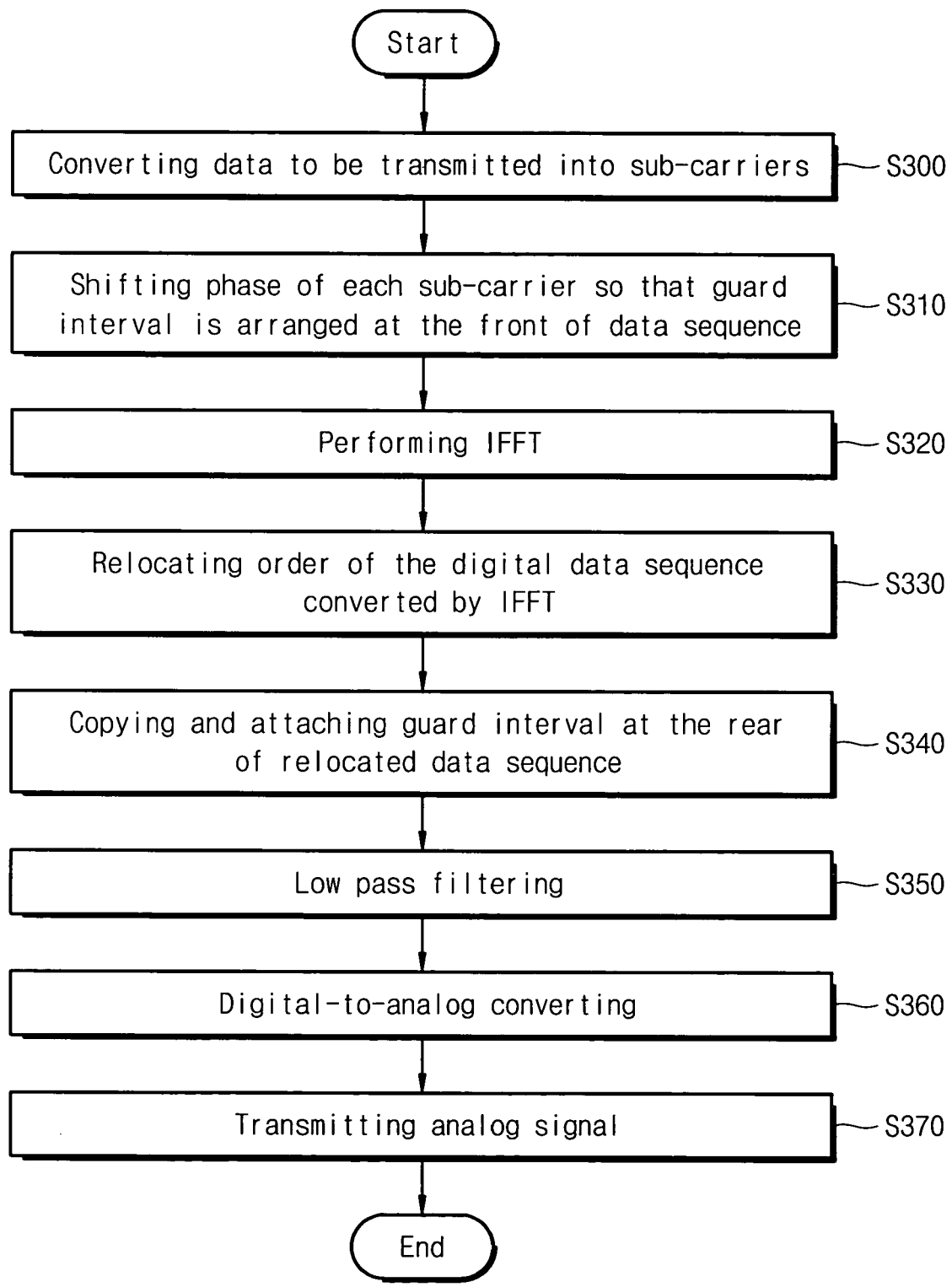
FIG. 10 is a flow chart illustrating exemplary of the transmitting part shown in FIG. 9.

FIG. 9 is a block diagram of the transmitting part of a data transmission system using OFDM according to some embodiments of the present invention. FIG. 10 is a flow chart illustrating exemplary operations of the transmitting part 100 shown in FIG. 9. Referring to FIG. 9, the transmitting part 100 includes an encoder 110, a time shifter 120, an inverse fast Fourier transform (IFFT) unit 130, a frequency shifter 140, a guard interval inserter 150, a low pass filter 160 and a digital-to-analog converter 170.

Referring to FIG. 10, in block S300, the encoder 110 converts data to be transmitted into encoded data corresponding to sub-carriers in the form of M-QAM, phase shift keying (PSK), differential PSK and the like. The encoder 10 may use any of a number of different codings including convolution encoding, block encoding, turbo encoding and the like.

In block S310, the time shifter 120 relocates the sequence of the sub-carrier symbols provided from the encoder. In block S320, the IFFT unit 130 transforms the sub-carrier signals in a frequency domain output from the time shifter 120 based on the sampling theorem.

In block S330, the frequency shifter 140 performs a calculation on the signals in the time domain output from the IFFT unit 130. According to this calculation, one can obtain the same effect as changing the sequence of the sub-carrier symbols input to the IFFT 130.

In block S340, the guard interval inserter 150 inserts respective guard intervals at the end of respective frames output from the frequency shifter 140. Accordingly, G (an integer value less than N) guard intervals are inserted to the front of the N sub-carriers symbols output from the frequency shifter 140.

In block S350, the low pass filter 160 removes noise components included in the signal output through the guard interval inserter 150. In block S360, the digital-to-analog converter 170 converts the digital signal output from the low pass filter 160 into an analog signal. In block S370, the analog signal converted by the digital-to-analog converter 170 is transmitted through wireless or wire channels.

Figure 11:
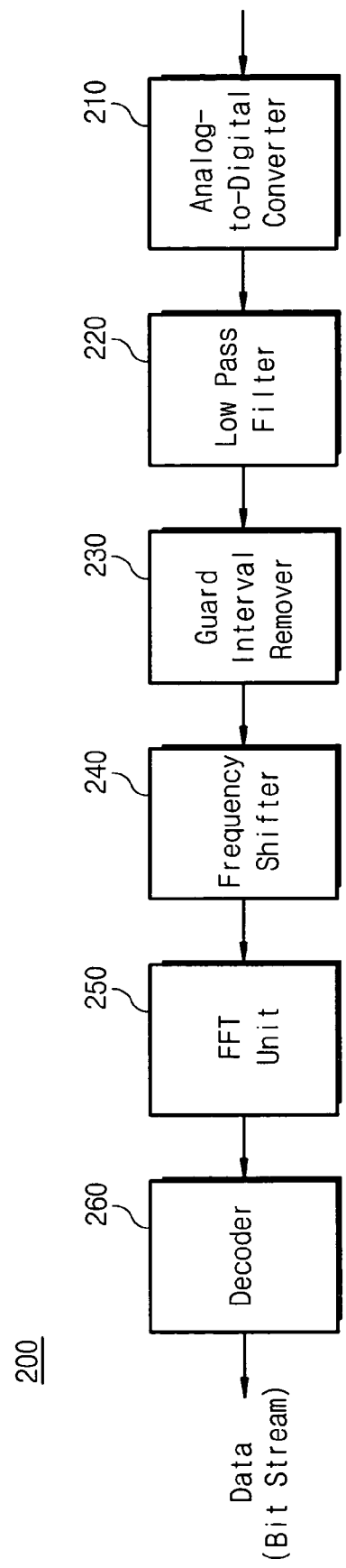
FIG. 11 is a block diagram of the receiving part of a data transmission system using OFDM according to embodiments of the present invention.
Figure 12:
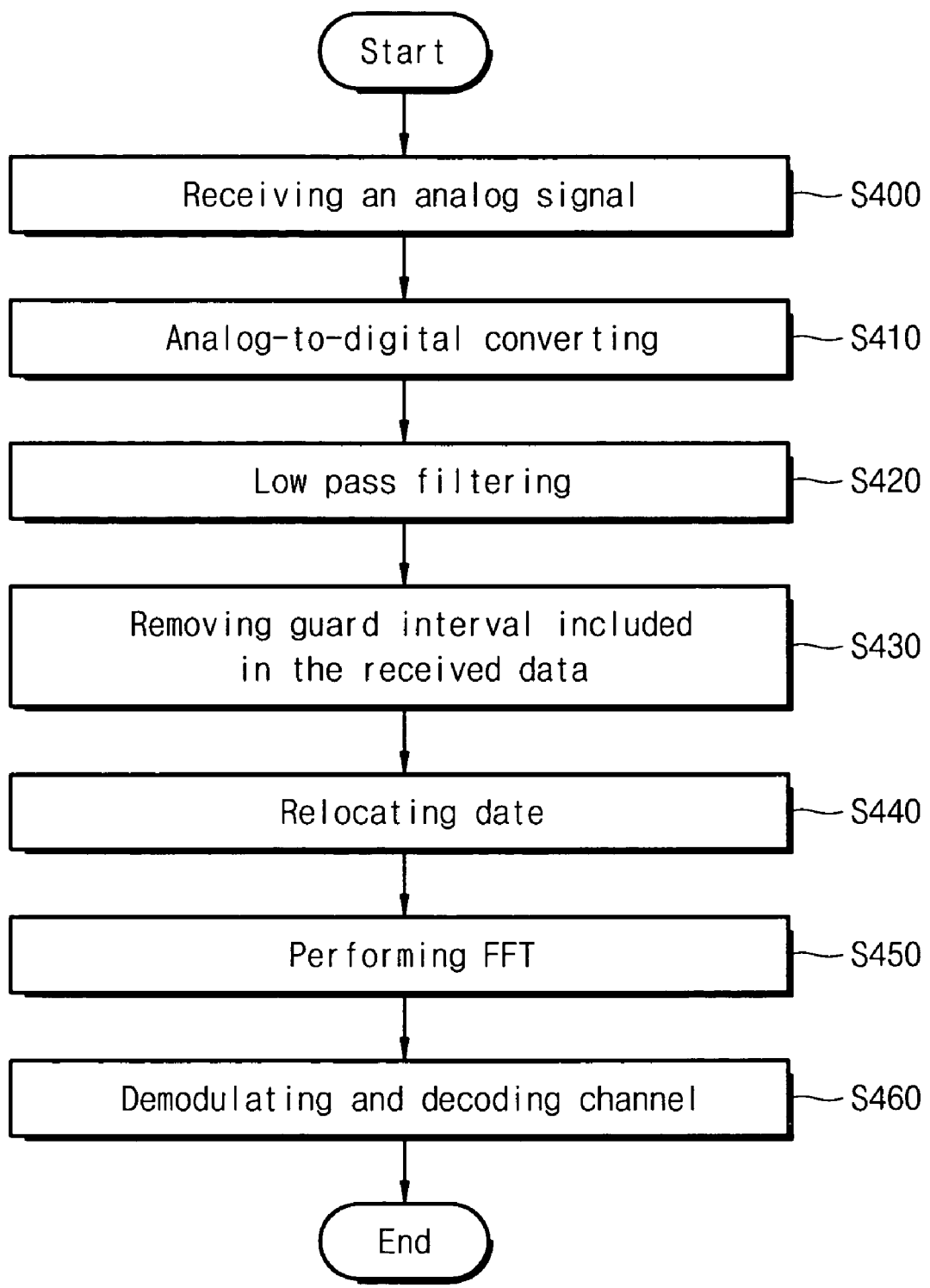
FIG. 12 is a flow chart illustrating exemplary operations of the receiving part shown in FIG. 9.

FIG. 11 is a block diagram of the receiving part of a data transmission system using OFDM according to further embodiments of the present invention. FIG. 12 is a flow chart illustrating exemplary operations of the receiving part. Referring to FIG. 11, the receiving part 200 includes an analog-to-digital converter 210, a low pass filter 220, a guard interval remover 230, a frequency shifter 240, a fast Fourier transform (FFT) unit 250, and a decoder 260.

Referring to FIG. 12, in block S400, the receiving part 200 receives an analog signal through wireless or wire channels. In block S410, the analog-to-digital converter 210 converts the analog signal received through the wire or wireless channel into a digital signal. In block S420, the low pass filter 220 removes noise components included in the received signal. In block S430, the guard interval remover 230 removes the guard interval from the signal provided through the low pass filter 220. In block S440, the frequency shifter 240 relocates the signal output from the guard interval remover 230 in a time domain. In block S450, the FFT unit 250 transforms the signal output from the frequency shifter 240 in a time domain. In block S460, the decoder 260 demodulates the received signal and performs channel decoding. The decoder 260 includes a deinterleaver and a Viterbi decoder.

Referring to FIG. 9, the configuration and the operation of the frequency shifter 140 of the transmitting part 100 will be described below. For convenience it will be assumed, for the purpose of this description, that the sub-carrier symbols output from the encoder 110 are directly input into the IFFT unit 130 without passing through the time shifter 120. The time shifter 120 will be described in detail later.

$$x(n) \leftrightarrow X(k) \quad (1)$$

As represented in expression (1), when a function $x(n)$ in the time domain is transformed by Fourier transform to the function $X(k)$ in the frequency domain, this pair of functions is called a Fourier pair. In expression (1), $x(n)$ is the n-th value of sampled values obtained by sampling the analog signal $x(t)$ with respect to time t at a predetermined interval. $X(k)$ is the value corresponding to the k-th frequency of $X(f)$, wherein $X(f)$ is the spectrum with respect to frequency f of $x(t)$. The bi-directional arrow symbolizes a Fourier transform. Here, n and k are indices of a time domain and a frequency domain respectively.

$$x(n-i) \leftrightarrow X(k)e^{\frac{-j2\pi ki}{N}} \quad (2)$$

$$x(n)e^{\frac{-j2\pi mn}{N}} \leftrightarrow X(k-m) \quad (3)$$

Expressions (2) and (3) represent characteristics of a time shift and a frequency shift respectively.

As known from expression (2), shifting the signal $x(n)$ in a time domain by i samples is the same as rotating the phase by $$e^{\frac{-j2\pi ki}{N}}$$

with respect to angular frequency in a frequency domain. In the alternative, as represented in expression (3), shifting the signal $X(k)$ in a frequency domain by m is the same as rotating the phase of every sample of the signal $x(n)$ in a time domain by $$e^{\frac{-j2\pi mn}{N}}.$$

In the present invention, the data sequence output from the IFFT unit 130 can be changed using the principles of Expressions (2) and (3).

To describe a method of changing the data sequence output from the IFFT unit 130, FIGS. 13A and 13B illustrate exemplary frequency spectra of signals to be input to an IFFT unit 130. First, referring to FIG. 13A, the angular frequency from $-\pi$ to $\pi$ corresponds to the sub-carriers from x32 to x63 and from x0 to x31. In addition, as known from the frequency spectrum, imaginary images are located with respect to integer times of $2\pi$.

The conventional sub-carrier relocating unit 12 changes data sequence x0-x63 provided from the encoder 111 to make new data sequence x32-x63, x0-x31. In other words, the data sequence x0-x63, corresponding to angular frequency from 0 to 2π, is changed into the new data sequence x32-x63, x0-x31, corresponding to angular frequency from −π to π.

In the present invention, the data sequence x0-x63, which is output from the encoder 110 and corresponds to angular frequency from 0 to 2π, is input to IFFT unit 130 as itself. Then, the same effect as performing IFFT on the data sequence x32-x63, x0-x31 can be obtained by changing the data sequence output from the IFFT unit 130 in the time domain. The frequency spectrum of the data sequence x0-x63, corresponding to angular frequency from 0 to 2π, is as shown in FIG. 13B.

Inputting the data sequence x0-x63, corresponding to angular frequency from 0 to 2π, is the same as shifting the data sequence x32-x63, x0-x31, corresponding to angular frequency from −π to π, by N/2 (in this embodiment, N=64) samples. Substituting m=N/2 in expression (3) results in the following equation: $e^{j2\pi mn/N} = e^{j\pi n}$, and this can be obtained by multiplying $e^{j\pi n}$ to the output value of the IFFT unit 130.

$$s(n) = x(n)e^{\frac{j2\pi mn}{N}} = x(n)e^{j\pi n} = x(n)(e^{j\pi})^n = (-1)^n x(n) \quad (4)$$

In other words, the result can be obtained by multiplying odd number-th data x1, x3, x5, . . . of the data sequence output from the IFFT unit 130 by −1 and multiplying even number-th data x0, x2, x4, . . . of the data sequence output from the IFFT unit 130 by +1.

Figure 14:
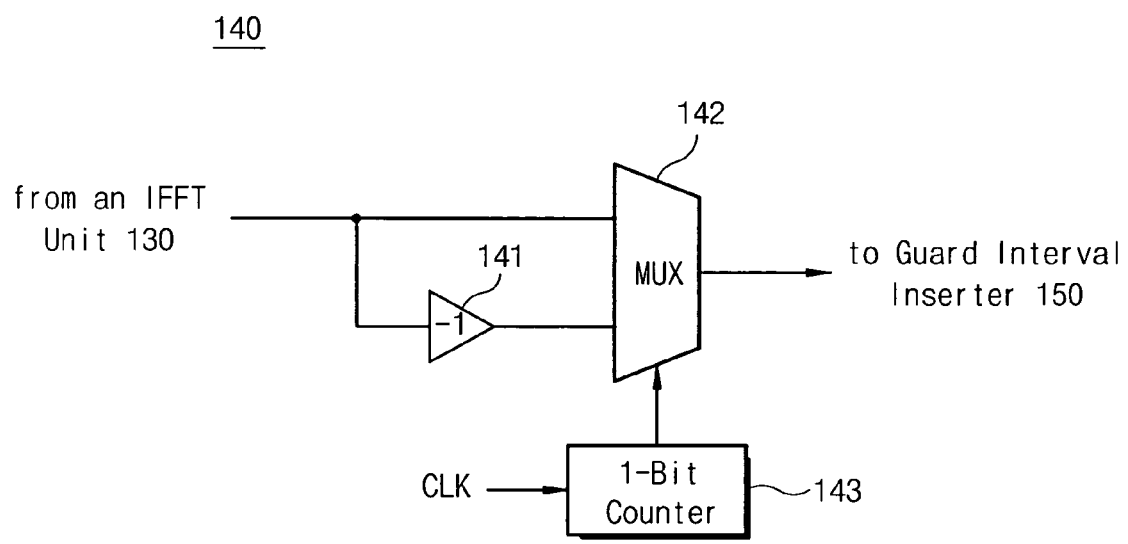
FIG. 14 is a block diagram of a frequency shifter.

FIG. 14 is a block diagram illustrating an inner configuration of a frequency shifter 140. Referring to FIG. 14, the frequency shifter 140 includes a multiplier 141, a multiplexer 142 and a 1-bit counter 143. The multiplier 141 multiplies the data output from the IFFT 130 by −1. The 1-bit counter 143 outputs count values alternating 0, 1, 0, 1, . . . in response to a clock signal CLK. The multiplexer 142 outputs one of the data symbols output from the IFFT unit 130 and the data symbols output from the IFFT unit 130 multiplied by −1 in response to the count value of the counter 143. Therefore, the odd number-th data of the data sequence output from the IFFT unit 130 are multiplied by −1 and output, while the even number-th data of the data sequence output from the IFFT unit 130 are output as themselves.

Figure 15:
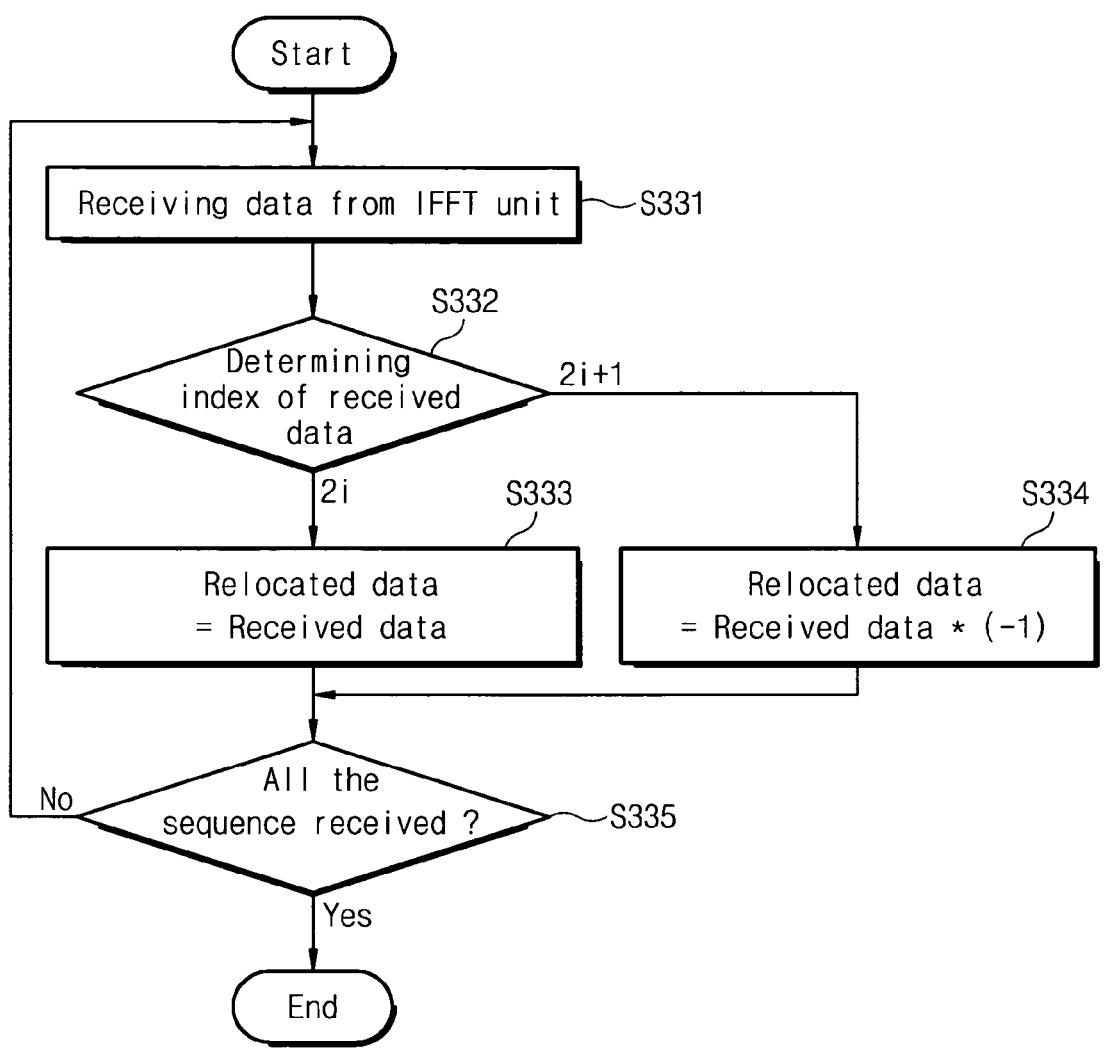
FIG. 15 is a flow chart illustrating exemplary operations of a frequency shifter.

FIG. 15 illustrates exemplary operations of the frequency shifter 140. In block S331, the frequency shifter 140 receives the data output from the IFFT unit 130. In block S332, the frequency shifter 140 determines the index k of the received data.

In block S334, the frequency shifter 140 multiplies the received data corresponding to an odd index, i.e., an index of 2i+1, where i=0, 1, 2. (N−1)/4, by −1 and outputs it as the relocated data. Received data corresponding to an even index, i.e., an index of 2i, go to block S333, where the received data itself is output as the relocated data, i.e., the data is not multiplied by −1. In block S335, the frequency shifter 140 terminates relocation when it is determined that all of the data sequence has been received. Otherwise it returns to block S331.

As described above, the frequency shifter 140 performs multiplication on the data sequence output from the IFFT unit 130 in a time domain. As a result, the same effect as performing IFFT calculation on the data sequence x32-x63, x0-x31, corresponding to angular frequency from −π to π, is obtained.

The guard interval insertion function of the transmitting part will now be described. The above-described expression (3) is applied to the guard interval insertion function of the present invention. The shifter 120 of the present invention changes the data sequence x0-x63 output from the encoder 110 into the new data sequence x48-x63, x0-x47 and outputs the new data sequence. To accomplish this, the time shifter 120 multiplies the data output the encoder 110 by $$e^{\frac{-j2\pi ki}{N}}.$$

For example, when the sub-carrier data sequence length N is two times the guard interval data sequence length G, the multiplier multiplied to the sub-carrier is as shown in expression (5). When the sub-carrier data sequence length N is four times the guard interval data sequence length G, the multiplier multiplied to the sub-carrier is as shown in Expression 6.

$$e^{\frac{-j2\pi k \frac{N}{2}}{N}} = e^{-j\pi k} = (-1)^n = \{-1, 1\} \quad (5)$$

$$e^{\frac{-j2\pi k \frac{N}{4}}{N}} = e^{\frac{-j\pi k}{2}} = (-1)^n = \{-1, -j, j, 1\} \quad (6)$$

The multiplier {−1, 1} obtained in expression (5) means rotating the phase of the sub-carrier that is complex data by {180°, 0°}. The multiplier {−1, −j, j, 1} obtained in Expression (6) means rotating the phase of the sub-carrier by {−180°, −90°, 90°, 0°}. Expression (7) illustrates the multiplier following the guard interval insertion length G.

$$x(n+G) = z(k) = \begin{cases} X(k)e^{\frac{j2\pi kG}{N}} = X(k), \text{ if } -i = G \\ X(k)e^{j\pi k} = X(k), \text{ if } -i = G = \frac{N}{2} \\ X(k)e^{\frac{j\pi k}{2}} = X(k), \text{ if } -i = G = \frac{N}{4} \end{cases} \quad (7)$$

Figure 16A:
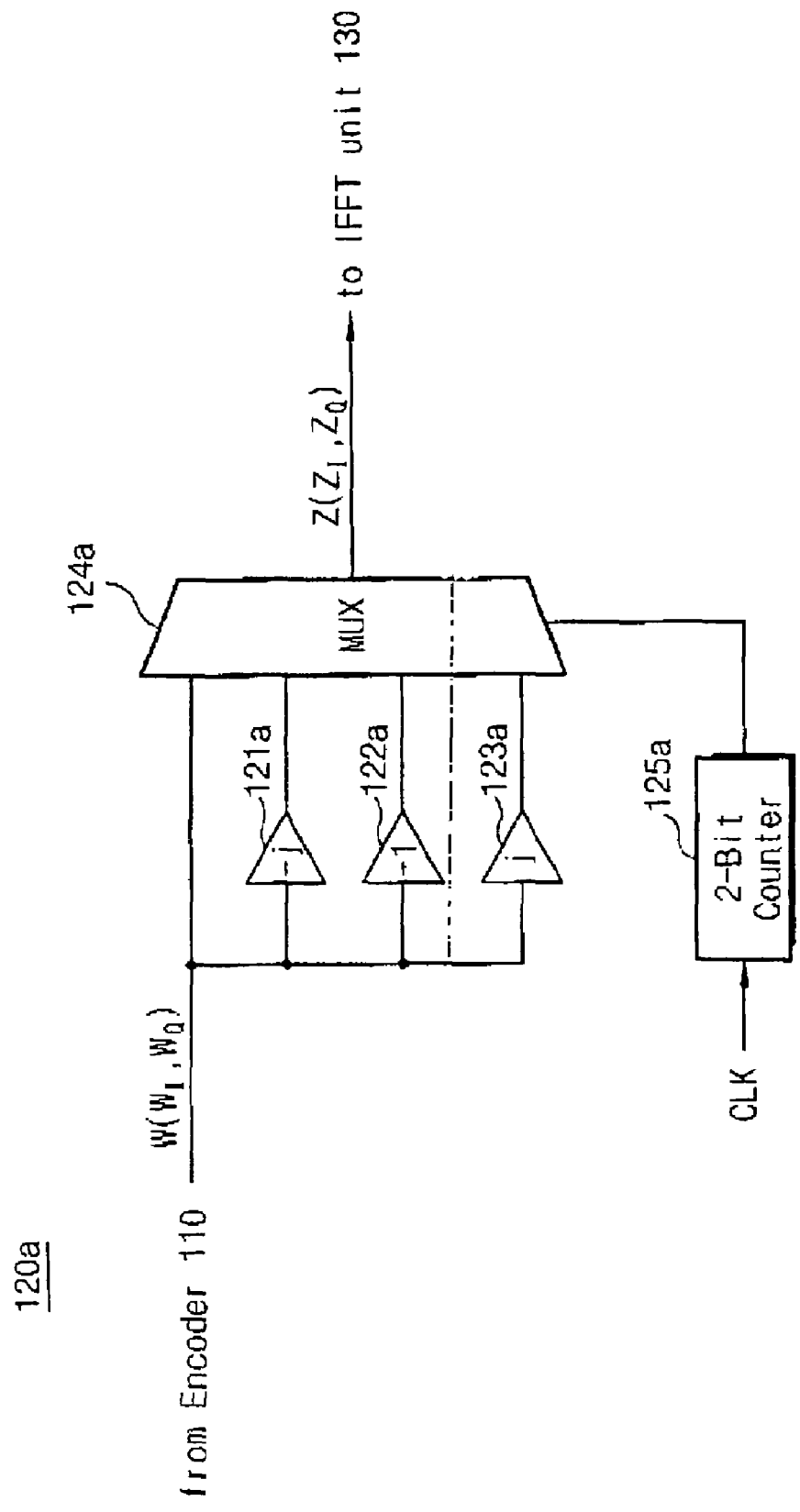
FIGS. 16A and 16B are embodiments of a time shifter shown in FIG. 9.
Figure 16B:
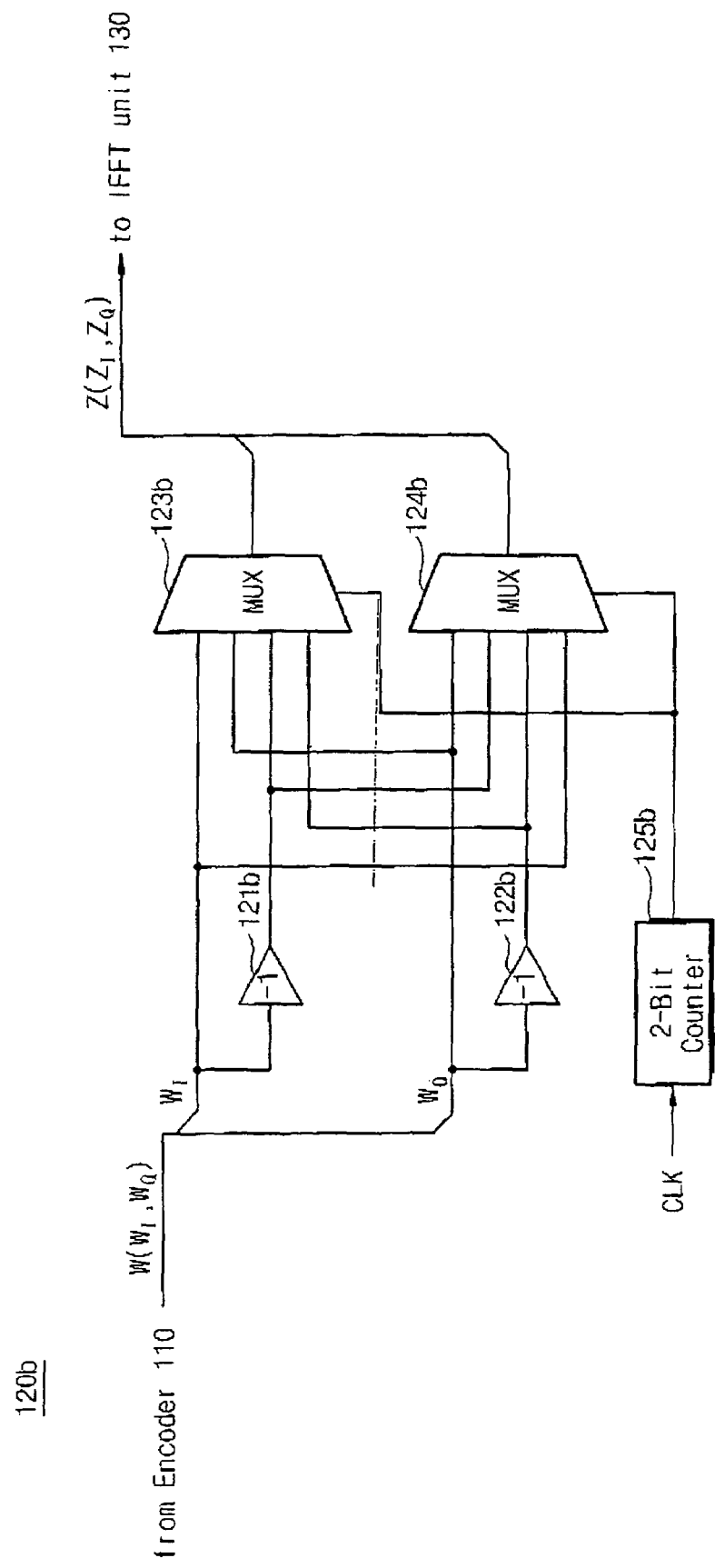

FIGS. 16A and 16B illustrate embodiments of a time shifter 120 shown in FIG. 9 for defining a guard interval length G of N/4 and N/2, respectively. Referring to FIG. 16A, the time shifter 120a includes multipliers 121a, 122a and 123a, a multiplexer 124a, and a 2-bit counter 125a.

The transmitting part 100 transmits sub-carrier symbols through an I-channel and a Q-channel so that the transmitted signal can be demodulated precisely at the receiving part 200. Therefore, the encoder 110 outputs sub-carrier W (W$_1$, W$_Q$), which includes I-channel sub-carrier W$_1$ and Q-channel sub-carrier W$_Q$. The multiplier 121a multiplies symbols for the sub-carrier W (W$_1$, W$_Q$) output from the encoder 110 by −j. The multiplier 122a multiplies symbols for the sub-carrier W (W$_1$, W$_Q$) output from the encoder 110 by −1. The multiplier 123a multiplies the sub-carrier W (W$_1$, W$_Q$) output from the encoder 110 by j. The 2-bit counter 125a changes the count value in the order of 0, 1, 2, 3, 0, 1, 2, 3, . . . in response to a clock signal CLK. The multiplexer 124a outputs symbols for one of the sub-carriers W (W$_1$, W$_Q$) input from the encoder 110 and symbols for the sub-carriers output from the multipliers 121a, 122a and 123a as the time-shifted signal Z (Z$_1$, Z$_Q$) in response to the count value of the counter 125a.

According to the time shifter 120a, the 0$^{th}$, 4$^{th}$, 8$^{th}$, 12$^{th}$, . . . sub-carrier symbols output from the encoder 110 are output as themselves through the multiplexer 124a. The 1$^{st}$, 5$^{th}$, 9$^{th}$, 13$^{th}$, . . . sub-carrier symbols output from the encoder 110 are multiplied by j at the multiplier 121a. The 2$^{nd}$, 6$^{th}$, 10$^{th}$, 14$^{th}$, . . . sub-carrier symbols output from the encoder 110 are multiplied by −1 at the multiplier 122a. The $3^{rd}$, $7^{th}$, $11^{th}$, $15^{th}$, sub-carriers output from the encoder 110 are multiplied by j at the multiplier 123a. Accordingly, the data sequence in a time domain output from IFFT unit 130 is x48-x63, x0-x47.

Figure 17:
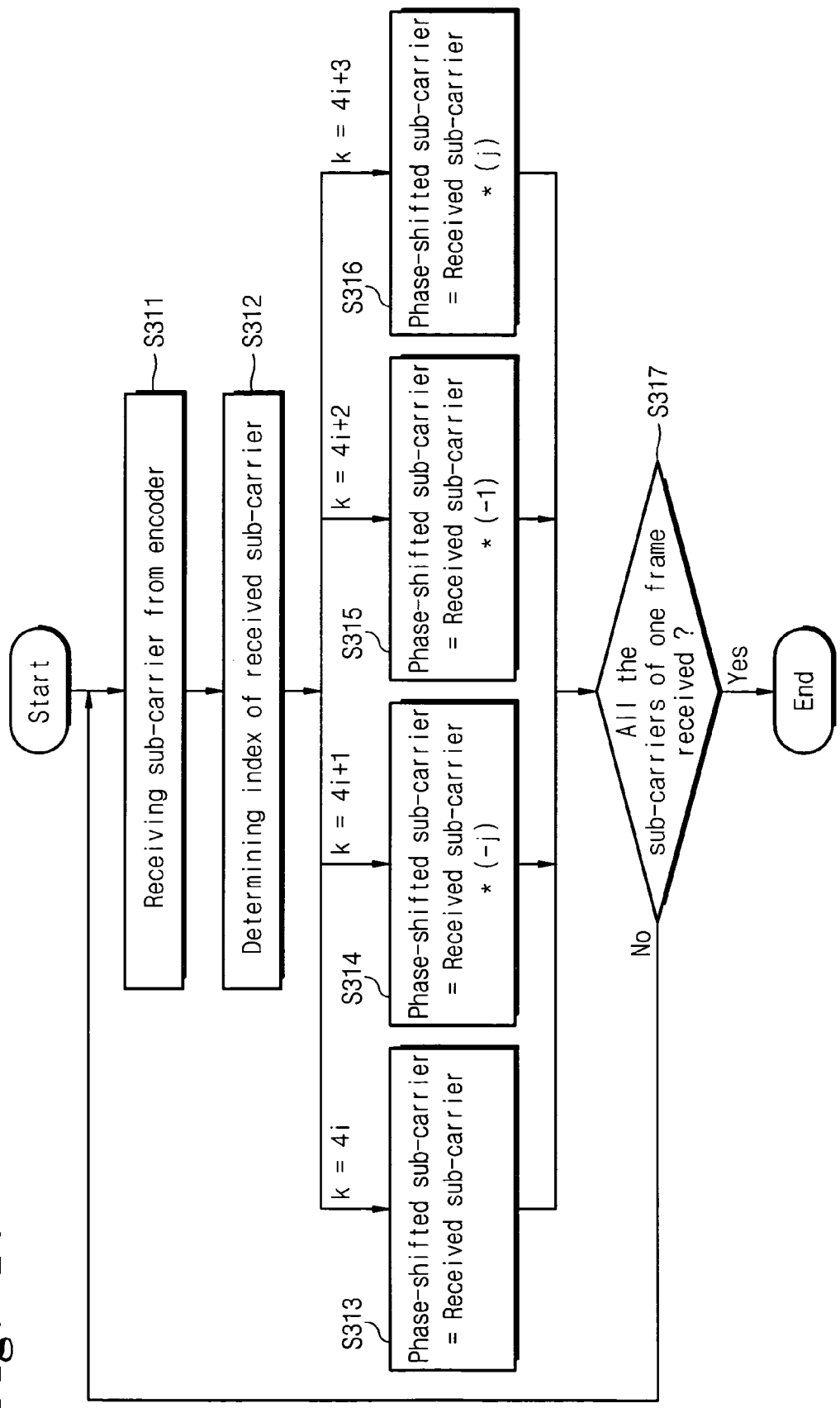
FIG. 17 is a flow chart illustrating exemplary operations of a time shifter shown in FIG. 16A.

FIG. 17 is a flow chart illustrating the operation flow of the time shifter 120a shown in FIG. 16A. Referring to FIG. 17, in block 311, the time shifter 120a receives the sub-carrier symbols from the encoder 110. In block S312, the time shifter 120a determines the index k of the received sub-carrier. As a result of the check, if the index k of the received sub-carrier is a multiple of four, that is, 4i (i=0, 1, 2, 3, . . . , (N−1)/4), the control goes to block S313 and the received sub-carrier itself is output as a phase-shifted sub-carrier. If, as a result of the check, the index k of the received sub-carrier is 4i+1, the control goes to block S314 and the received sub-carrier is multiplied by −j and output as a phase-shifted sub-carrier. If, as a result of the check, the index k of the received sub-carrier is 4i+2, the control goes to block S315 and the received sub-carrier is multiplied by −1 and output as a phase-shifted sub-carrier. If, as a result of the check, the index k of the received sub-carrier is 4i+3, the control goes to block S316 and the received sub-carrier is multiplied by j and output as a phase-shifted sub-carrier. In block S317, the time shifter 120a determines whether symbols for all the sub-carriers of one frame have been received. If symbols for all the sub-carriers of one frame have been received, the time shifter 120a ceases to operate. Otherwise, the control returns to block 311.

In other embodiments, the time shifter 120b for creating a guard interval length G of N/2, shown in FIG. 16B, includes multipliers 121b and 122b, multiplexers 123b and 124b and a 2-bit counter 125b. The multiplier 121b multiplies symbols for an I-channel sub-carrier $W_I$ provided from the encoder 110 by −1. The multiplier 122b multiplies symbols for a Q-channel sub-carrier $W_Q$ provided from the encoder 110 by −1. The 2-bit counter 125b changes the count value in the order of 0, 1, 2, 3, 0, 1, 2, 3, . . . in response to a clock signal CLK. The multiplexer 123b outputs one of the I-channel sub-carrier $W_I$, the Q-channel sub-carrier $W_Q$, the I-channel sub-carrier $W_I$ multiplied by −1 and the Q-channel sub-carrier $W_Q$ multiplied by −1 as an I-channel sub-carrier $Z_I$ in response to the count value of the counter 125a. The multiplexer 124b outputs one of the Q-channel sub-carrier $W_Q$, the I-channel sub-carrier $W_I$ multiplied by −1 and the Q-channel sub-carrier $W_Q$ multiplied by −1 and the I-channel sub-carrier $W_I$ as a Q-channel sub-carrier $Z_Q$ in response to the count value of the counter 125a.

According to the time shifter 120b, the $0^{th}$, $2^{nd}$, $4^{th}$, $6^{th}$, . . . sub-carriers output from the encoder 110 are output as themselves through the multiplexers 123b and 124b. The $1^{st}$, $3^{rd}$, $5^{th}$, $7^{th}$. . . sub-carriers output from the encoder 110 are multiplied by −1 and output through the multiplexers 123b and 124b. Accordingly, the data sequence in a time domain output from IFFT unit 130 is x32-x63, x0-x31.

Figure 18:
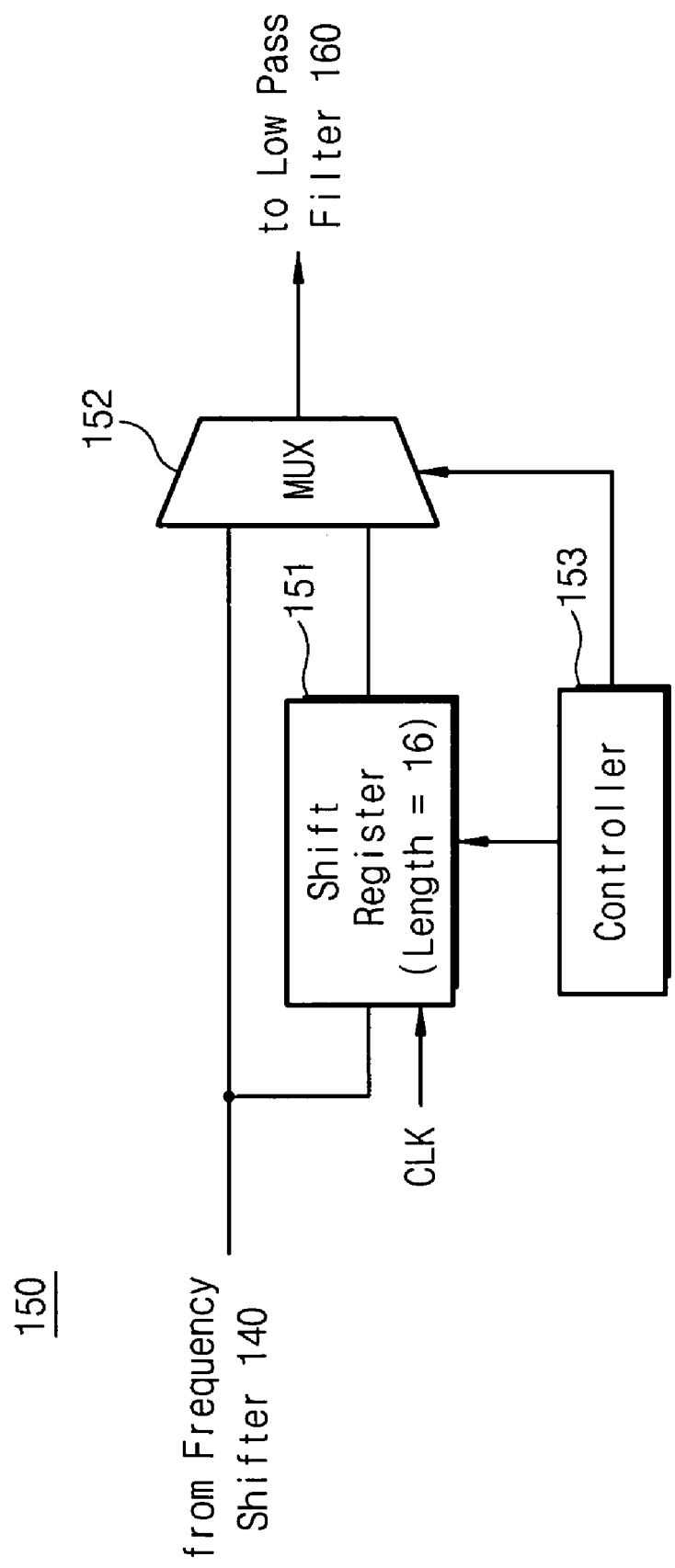
FIG. 18 is a block diagram of a guard interval inserter shown in FIG. 9.
Figure 19:
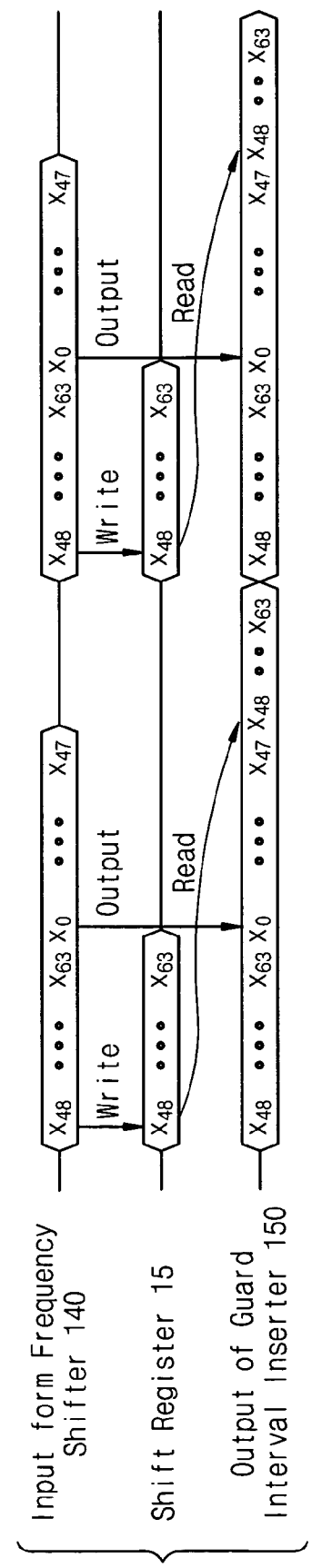
FIG. 19 is a timing diagram of the guard interval inserter shown in FIG. 18.

FIG. 18 is a block diagram of an embodiment of the guard interval inserter 150 shown in FIG. 9. FIG. 19 is a timing diagram of the guard interval inserter 150 shown in FIG. 18. Referring to FIG. 18, the guard interval inserter 150 includes a shift register 151, a multiplexer 152 and a controller 153. As described above, the sub-carrier sequence input to the guard interval inserter 150 from the frequency shifter 140, based on the relocation performed by the time shifter 120, is x48-x63, x0-x47 (assuming G=N/4). The controller 153 controls the data output from the frequency shifter 140 that is to be stored in the shift register 151 when it is x48-x63 (i.e., the guard interval data). The shift register 151 shifts the data provided from the frequency shifter 140 by 1 and stores it, in response to a control signal provided from the controller 153 and a clock signal CLK. Meanwhile, controller 153 controls the data x48-x63 output from the frequency shifter 140 to be output through the multiplexer 152 at the same time the data is being stored in the shift register 151. When the data provided from the frequency shifter 140 is x0-x47, the controller 153 controls the data provided from the frequency shifter 140 not to be stored in the shift register 151 but to be output through the multiplexer 152. However, after the datum x47 is output through the multiplexer 152, the controller 153 controls the data x48-x63 stored in the shift register 151 to be sequentially output one by one through the multiplexer 152.

As a result, in some embodiments, the data of one frame output from the guard interval inserter 150 is x47-x63, x0-x63 due to the time shifter 120 and the guard interval inserter 150.

If the sub-carrier data sequence length N is an integer times (e.g., 2 times or 4 times) the guard interval data sequence length G, the circuit configuration of the time shifter 120 is less complex. Otherwise, the circuit configuration of the time shifter 120 may be complex. To resolve this problem, for example, if $$0 \leq G \leq \frac{N}{4},$$

the time shifter 120 changes the sub-carrier sequence using Expression 6. The guard interval inserter 150 stores $$\frac{N}{4} - G$$

data in the shift register 151 and outputs the data input after $$\frac{N}{4} - G$$

data as is. The guard interval inserter 150 reads out and outputs the data stored in the shift register 151. As another example, if $$\frac{N}{4} \leq G \leq \frac{N}{2},$$

the time shifter 120 changes the sub-carrier sequence using Expression 5. The guard interval inserter 150 stores $$\frac{N}{2} - G$$

data in the shift register 151 and outputs the data input after $$\frac{N}{2} - G$$

data as is. The guard interval inserter 150 reads out and outputs the data stored in the shift register 151. According to these methods, even though the sub-carrier data sequence length N is not an integer times the guard interval data sequence length G, the complexity can be maintained as if it was.

Figure 20:
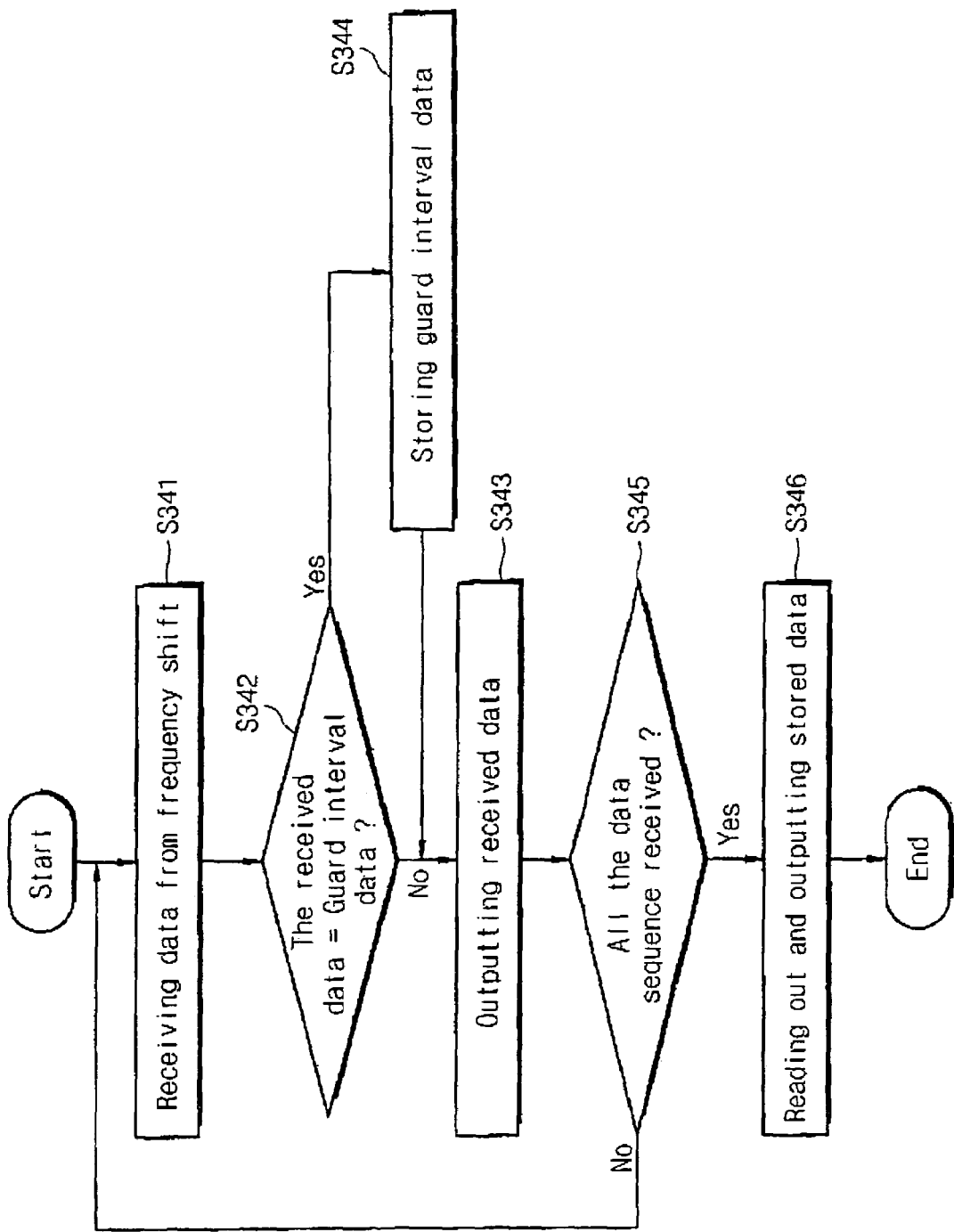
FIG. 20 is a flow chart illustrating exemplary operations of a guard interval inserter according to embodiments of the present invention.

FIG. 20 is a flow chart illustrating exemplary operations of a guard interval inserter 150 according to embodiments of the present invention. Referring to FIG. 20, in block 341, the guard interval inserter 150 receives the data output from the frequency shifter 140. In block S342, it is determined whether the received data belongs to the guard interval. As a result of this determination, if the received data belongs to the guard interval, the control goes to block S344 and the received guard interval data is stored in the shift register 151. A replica of the guard interval data is then output in block S343. If the received data does not belong to the guard interval, the control goes directly to block S343 and the received data is output as is.

In block S345, the guard interval inserter 150 determines whether all of the data sequence has been received. If so, the control goes to block S346. Otherwise, the control returns to block S341. In block S346, the guard interval inserter 150 reads out and outputs the data stored in the shift register 151.

Meanwhile, in the receiving part 200, the guard interval remover 230 removes the guard interval x47-x63 attached to the front of one frame received from a channel and output through an analog-to-digital converter 210 and a low pass filter 220. In addition, the sub-carrier sequence output from the guard interval remover 230 is relocated into x0-x63 by the frequency shifter.

Figure 1:
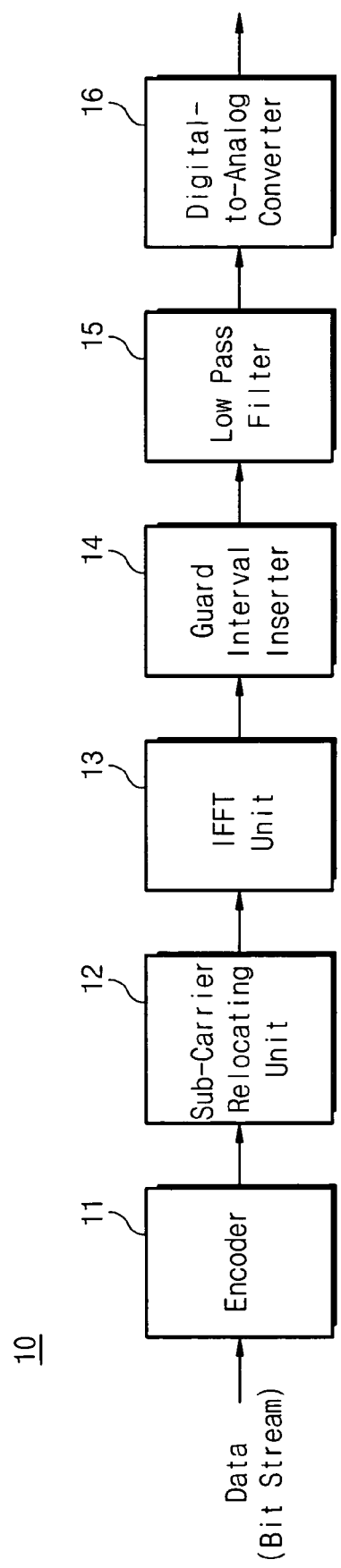
FIG. 1 illustrates a transmitting part of a data transmission system using OFDM.
Figure 2:
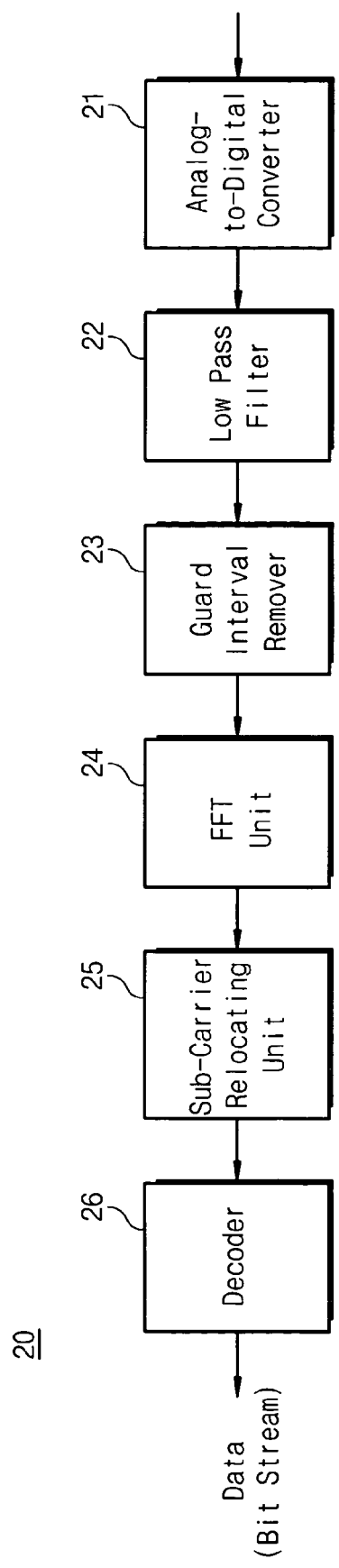
FIG. 2 illustrates a receiving part of a data transmission system using ODFM.
Figure 3:
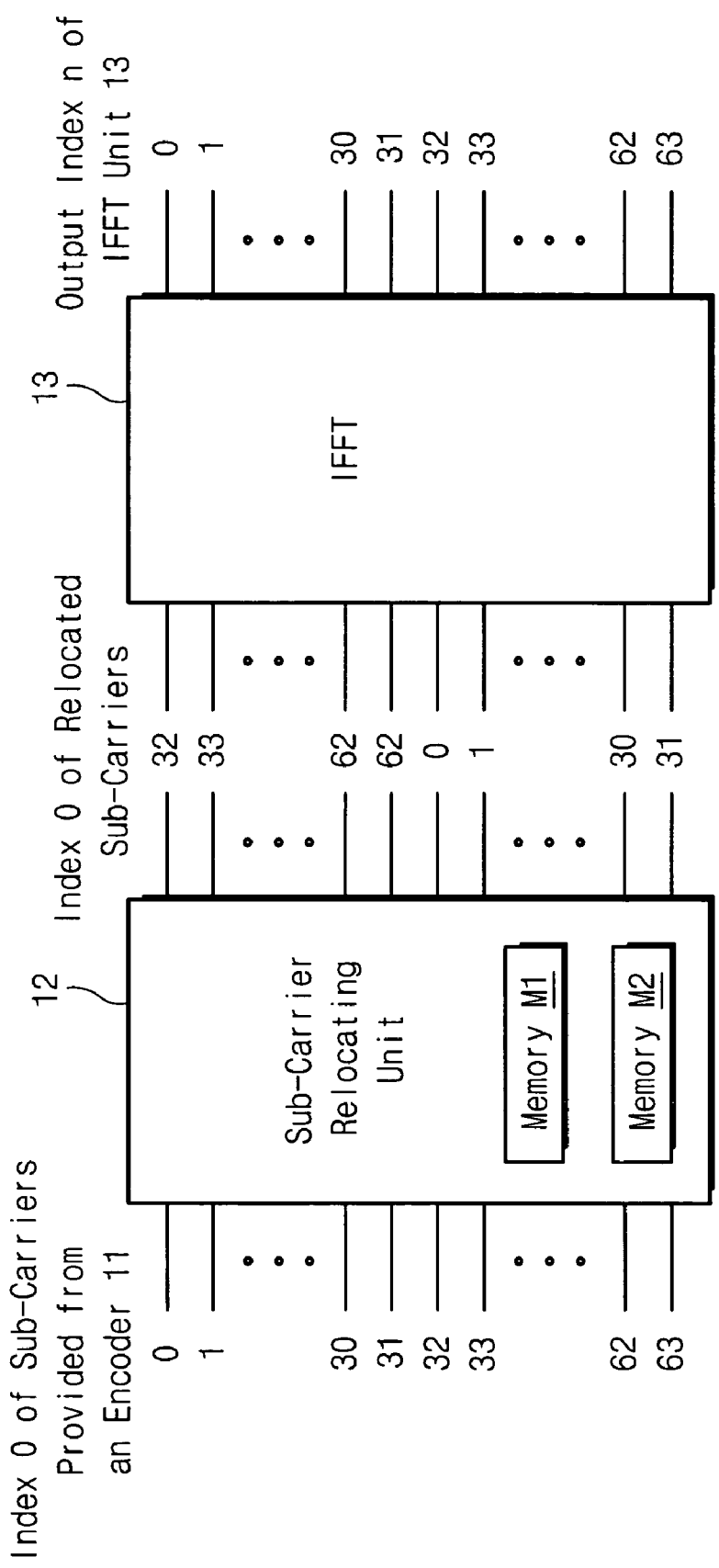
FIG. 3 is a block diagram of the sub-carrier relocating unit shown in FIG. 1.
Figure 4:
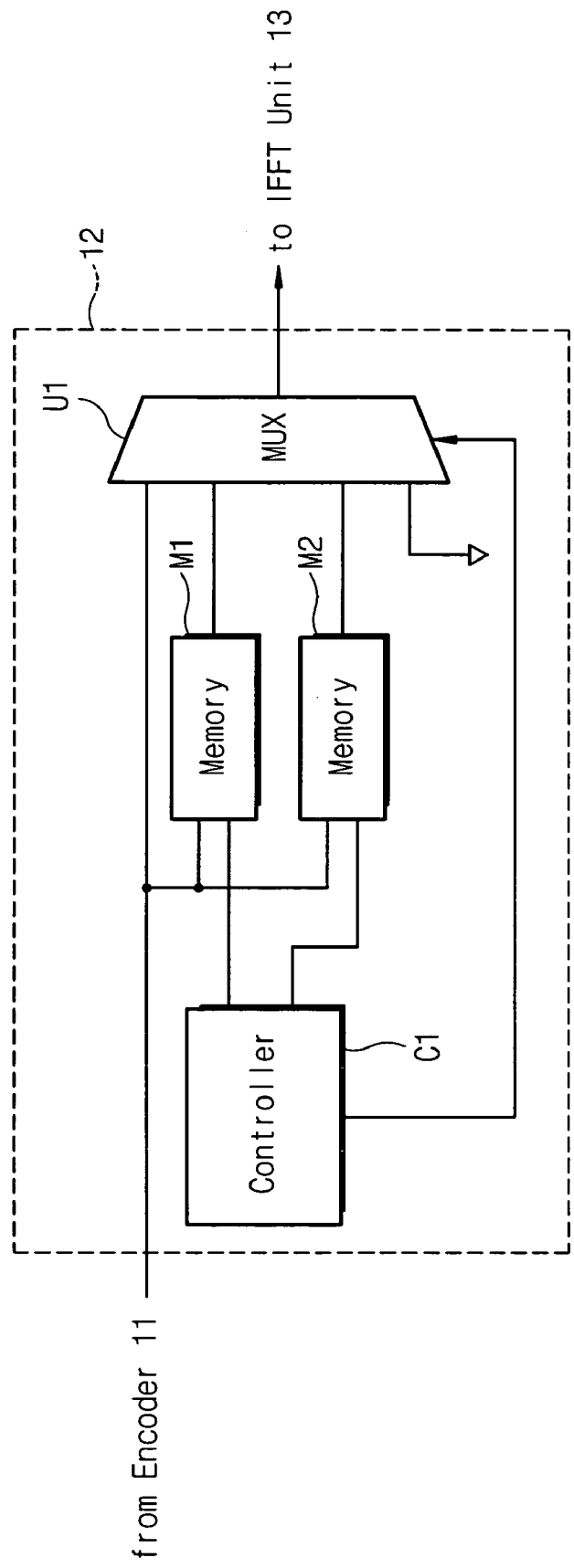
FIG. 4 is a block diagram of the sub-carrier relocating unit shown in FIG. 1.
Figure 7:
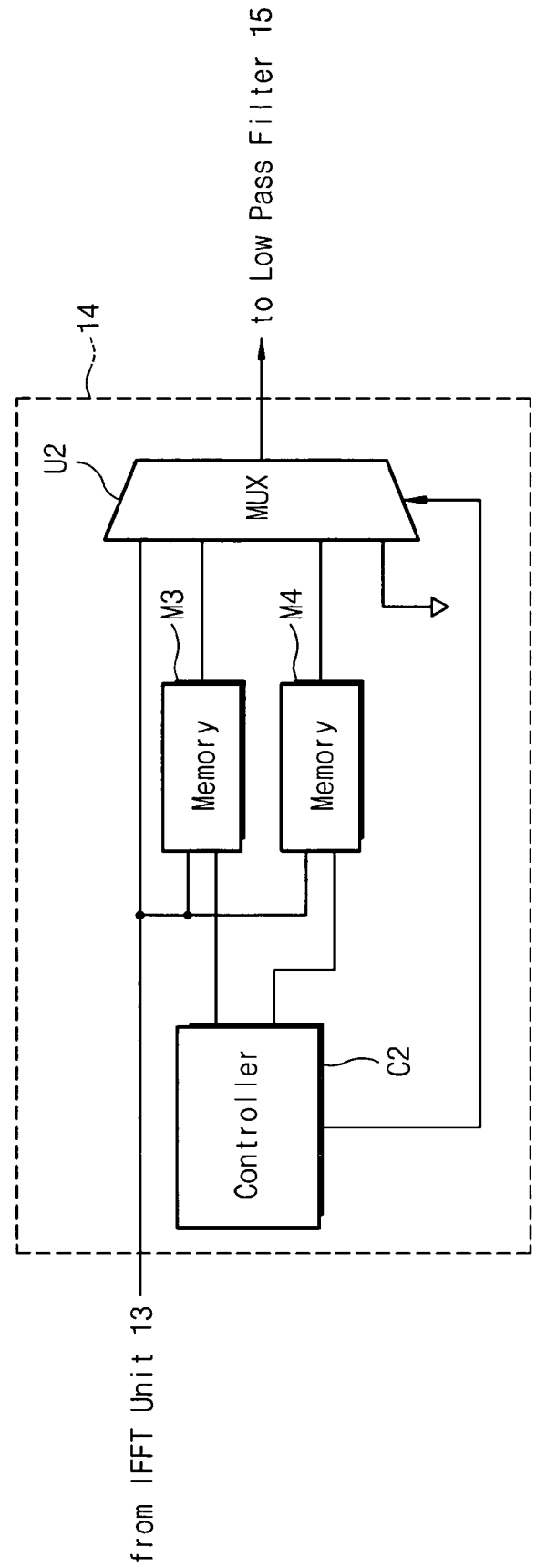
FIG. 7 is a block diagram illustrating the internal circuit configuration of a guard interval inserter.
Figure 8:
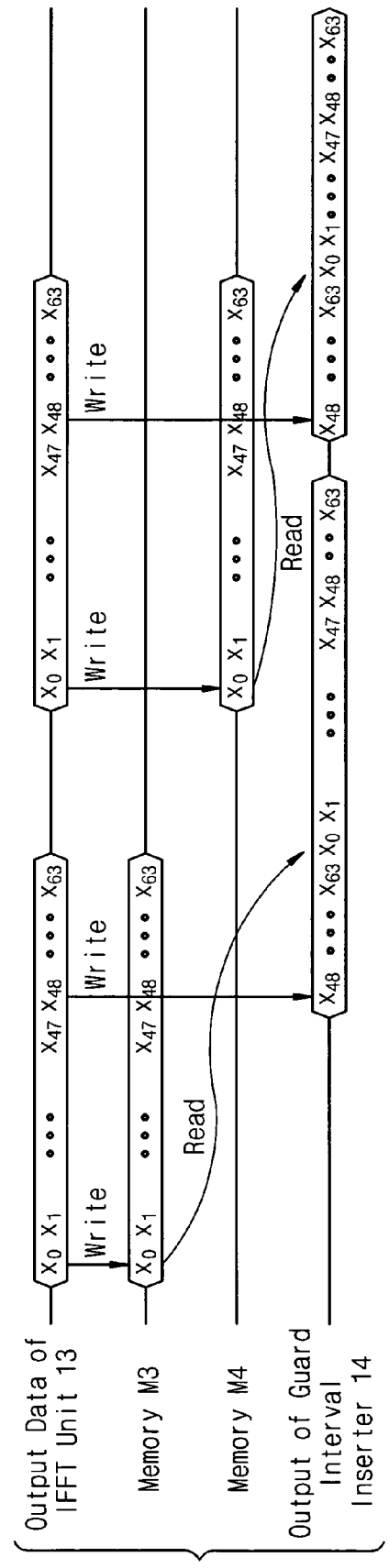
FIG. 8 is a timing diagram illustrating the operation of a guard interval inserter.

A multi-carrier transmission system according to some embodiments of the present invention as described above can reduce the time required for relocating sub-carriers and inserting a guard interval. For example, according to the conventional art shown in FIG. 1, the time required for relocating sub-carriers and inserting a guard interval may be 2N–G clock cycles. However, according to some embodiments of the present invention, the delay time is almost zero. Accordingly, reducing data processing times at the transmitting part and the receiving part of the multi-carrier transmission system enhances the transmission efficiency of the entire communication system. In addition, the multi-carrier transmission system of the present invention has a relatively simple circuit configuration. For example, the conventional sub-carrier relocating unit may require memories for storing N/2 sub-carriers, but the frequency shifter of the present invention does not require any memories. The conventional guard interval inserter may require two memories for storing N–G sub-carriers, while the guard interval inserter of the present invention requires only a 16-bit shift register.

The present invention has been described using exemplary embodiments. However, it is well understood that the scope of the present invention is not limited to the embodiments disclosed in this specification. Furthermore, it will be apparent to those skilled in the art that various modifications and variations can be made in the present invention. Thus, it is intended that the present invention covers the modifications and variations of this invention provided they come within the scope of the appended claims and their equivalents.

According to the present invention, the multi-carrier transmission system may reduce data processing time. As a result, the transmission efficiency of the entire communication system may be enhanced. In addition, the data transmission system of the present invention performs sub-carrier relocation functions and guard interval insertion functions using relatively simple elements. Therefore, the price of the data transmission system can be lowered and its circuit area may be reduced.

What is claimed is:

1. A multi-carrier transmission system comprising:
   an encoder that converts a data sequence into encoded symbols corresponding to respective sub-carriers;
   a first shifter that rearranges the encoded symbols to define a guard interval length;
   an inverse fast Fourier transform (IFFT) unit that inverse fast Fourier transforms the rearranged encoded symbols;
   a second shifter that multiplies respective ones of the transformed symbols by multipliers that are a function of a frequency shift effected by the IFFT unit to generate respective processed symbols; and
   a guard interval inserter that interleaves symbol replicas with the processed symbols according to the guard interval length.

2. The multi-carrier transmission system according to claim 1, wherein the first shifter comprises:
   a plurality of phase shifters that shift an angular frequency of at least one of the encoded symbols;
   a counter that increases a count value in response to a clock signal; and
   a multiplexer that outputs one of the encoded symbols and the phase-shifted symbols in response to the count value.

3. The multi-carrier transmission system according to claim 2, wherein each of the plurality of phase shifters comprise a multiplier that multiplies the encoded symbols according to the equation $x(n-i) \Leftrightarrow X(k)e^{j2\pi ki/N}$, wherein N is the length of the data sequence and i is the length of the guard interval in terms of N.

4. The multi-carrier transmission system according to claim 1, wherein the guard interval length is one-fourth the length of the data sequence, and wherein the first shifter comprises:
   a first phase shifter that shifts an angular frequency of at least one of the encoded symbols by –90°;
   a second phase shifter that shifts an angular frequency of at least one of the encoded symbols by –180°;
   a third phase shifter that shifts an angular frequency of at least one of the encoded symbols by 90°;
   a counter that increases a count value in response to a clock signal; and
   a multiplexer that outputs one of the encoded symbols and the phase-shifted symbols output from the first, second and third phase shifters in response to the count value.

5. The multi-carrier transmission system according to claim 4, wherein the first, second and third phase shifters each comprise a multiplier that multiplies the encoded symbols according to the equation $x(n-i) \Leftrightarrow X(k)e^{j2\pi ki/N}$, wherein N is the length of the data sequence and i is N/4.

6. The multi-carrier transmission system according to claim 1, wherein the guard interval length is one-half the length of the data sequence, and wherein the first shifter comprises:
   a first phase shifter that shifts an angular frequency of at least one of the encoded symbols by 180°;
   a counter that increases a count value in response to a clock signal; and
   a multiplexer that outputs one of the encoded symbols and the phase-shifted symbols in response to the count value.

7. The multi-carrier transmission system according to claim 6, wherein the first phase shifter comprises a multiplier that multiplies the plurality of symbols output from the encoder according to the equation $x(n-i) \Leftrightarrow X(k)e^{j2\pi ki/N}$, wherein N is the length of the data sequence and i is N/2.

8. The multi-carrier transmission system according to claim 1, wherein the second shifter comprises:

a multiplier that multples the transformed symbols according to the equation $x(n-i) \Leftrightarrow X(k)e^{j2\pi ki/N}$, wherein N is the length of the data sequence and m is N/2;

a counter that increases a count value in response to a clock signal; and a multiplexer that outputs one of the transformed symbols and the multiplied symbols in response to the count value.

9. The multi-carrier transmission system according to claim 1, wherein the guard interval inserter comprises:

a controller that determines whether symbols output from the second shifter correspond to the guard interval;

a shift register that stores symbols determined by the controller to correspond to the guard interval; and a multiplexer that outputs the symbols output from the second shifter and the symbols stored in the shift register.

10. A method of transmitting a multi-carrier signal, the method comprising:

converting a data sequence into encoded symbols corresponding to respective sub-carriers;

rearranging the encoded symbols to define a guard interval length;

inverse fast Fourier transforming the rearranged encoded symbols;

multiplying respective ones of the transformed symbols by multipliers that are a function of a frequency shift effected by the inverse fast Fourier transformation to generate respective processed symbols; and interleaving symbol replicas with the processed symbols according to the guard interval length.

11. The method of transmitting a multi-carrier signal according to claim 10, wherein converting a data sequence into encoded symbols further comprises:

converting the data to be transmitted into a plurality of symbols arranged in series;

converting the plurality of symbols arranged in series into a plurality of symbols arranged in parallel;

rectangular pulse-shaping the plurality of symbols arranged in parallel; and modulating the plurality of rectangular pulse-shaped symbols with a plurality of sub-carriers.

12. The method of transmitting a multi-carrier signal according to claim 10, wherein rearranging the encoded symbols to define a guard interval length comprises:

receiving the encoded symbols;

determining the index associated with each of the received symbols;

shifting an angular frequency of at least one of the received symbols based on the index associated with each symbol.

13. The method of transmitting a multi-carrier signal according to claim 12, wherein shifting an angular frequency of at least one of the received signals is performed according to the equation $x(n-i) \Leftrightarrow X(k)e^{j2\pi ki/N}$, wherein N is the length of the data sequence, k is the index of the symbol, and i is the length of the guard interval in terms of N.

14. The method of transmitting a multi-carrier signal according to claim 10, wherein the length of the data sequence is N (a positive integer), and wherein the guard interval length is G (a positive integer less than N).

15. The method of transmitting a multi-carrier signal according to 14, wherein the guard interval corresponds to the last G symbols of the data sequence.

16. The method of transmitting a multi-carrier signal according to claim 15, wherein the first shifter shifts the encoded symbols to position the last G symbols, corresponding to the guard interval, in the front of the data sequence.

17. The method of transmitting a multi-carrier signal according to claim 14, wherein U is one-fourth of N, and wherein rearranging the encoded symbols to define a guard interval length comprises:

receiving the encoded symbols;

determining the index associated with each of the received symbols;

shifting an angular frequency of at least one of the received signals according to the equation $x(n-i) \Leftrightarrow X(k)e^{j2\pi ki/N}$, wherein k is the index of the symbol and i is N/4.

18. The method of transmitting a multi-carrier signal according to claim 14, wherein G is one-half of N, and wherein rearranging the encoded symbols to define a guard interval length comprises:

receiving the encoded symbols;

determining the index associated with each of the received symbols;

shifting an angular frequency of at least one of the received signals according to the equation $x(n-i) \Leftrightarrow X(k)e^{j2\pi ki/N}$, wherein k is the index of the symbol and i is N/2.

19. The method of transmitting a multi-carrier signal according to claim 10, multiplying respective ones of the transformed symbols by multipliers that are a function of a frequency shift effected by the inverse fast Fourier transformation to generate respective processed symbols comprises:

receiving the transformed symbols;

determining the index associated with each of the received symbols;

multiplying certain of the received symbols by 1 according to the equation $x(n-i) \Leftrightarrow X(k)e^{j2\pi ki/N}$, wherein N is the length of the data sequence, k is the index of the symbol and m is N/2.

20. The method of transmitting a multi-carrier signal according to claim 10, wherein interleaving symbol replicas with the processed symbols according to the guard interval length comprises:

receiving the processed symbols;

determining whether each of the processed symbols corresponds with the guard interval;

storing guard interval symbols in a shift register;

outputting the processed symbols not corresponding with the guard intervals and replicas of the guard interval symbols; and outputting the guard interval symbols stored in the shift register at the rear of the output symbols.

* * * * *

UNITED STATES PATENT AND TRADEMARK OFFICE
CERTIFICATE OF CORRECTION

PATENT NO. : 7,480,336 B2
APPLICATION NO. : 10/703646
DATED : January 20, 2009
INVENTOR(S) : Park et al.

It is certified that error appears in the above-identified patent and that said Letters Patent is hereby corrected as shown below:

Column 14, Claim 3, Line 27:
Column 14, Claim 5, Line 49:
Column 14, Claim 7, Line 64:
Column 15, Claim 13, Line 56:
Column 16, Claim 17, Line 20:
Column 16, Claim 18, Line 30:
Please correct "$x(n-i) \leftrightarrow X(k)e^{j2\pi ki/N}$" by adding a negative before the j to read -- $x(n-i) \leftrightarrow X(k)e^{-j2\pi ki/N}$ --

Column 15, Claim 8, Line 2: Please correct "$x(n-i) \leftrightarrow X(k)e^{j2\pi ki/N}$" to read -- $x(n)e^{-j2\pi mn/N} \leftrightarrow X(k-m)$ --

Column 16, Claim 17, Line 13: Please correct "U" to read -- G --

Column 16, Claim 19, Line 40: Please correct "by 1" to read -- by -1 --

Column 16, Claim 19, Line 41: Please correct "$x(n-i) \leftrightarrow X(k)e^{j2\pi ki/N}$" to read -- $x(n)e^{-j2\pi mn/N} \leftrightarrow X(k-m)$ --

Signed and Sealed this

Twenty-sixth Day of May, 2009

JOHN DOLL
*Acting Director of the United States Patent and Trademark Office*